United States Patent [19]

Duenstl et al.

[11] Patent Number: 4,958,518

[45] Date of Patent: Sep. 25, 1990

[54] SENSOR FOR DETERMINING LIQUID LEVEL IN A CONTAINER

[75] Inventors: Josef Duenstl; Siegfried Willner, both of Lichtenfels; Ralph Schroeppel, Nuenmarkt, all of Fed. Rep. of Germany

[73] Assignee: Siemens Aktiengesellschaft, Berlin and Munich, Fed. Rep. of Germany

[21] Appl. No.: 259,518

[22] Filed: Oct. 18, 1988

[30] Foreign Application Priority Data

Oct. 19, 1987 [DE] Fed. Rep. of Germany ....... 3735666
Jul. 21, 1988 [DE] Fed. Rep. of Germany ....... 3825047

[51] Int. Cl.⁵ .............................................. G01F 23/28
[52] U.S. Cl. .................................. 73/290 V; 340/621; 367/908
[58] Field of Search ............. 73/290 V; 367/908, 188; 340/621

[56] References Cited

U.S. PATENT DOCUMENTS

| | | | |
|---|---|---|---|
| 3,930,218 | 12/1975 | Hall, Jr. | ................. 367/188 |
| 4,063,457 | 12/1977 | Zekulin et al. | . |
| 4,374,477 | 2/1983 | Kikuchi et al. | ................ 73/861.18 |
| 4,432,231 | 2/1984 | Napp et al. | ................ 73/290 V |
| 4,507,583 | 3/1985 | Jensen et al. | ................ 340/621 X |

FOREIGN PATENT DOCUMENTS 1208089 12/1965 Fed. Rep. of Germany .

*Primary Examiner*—Daniel M. Yasich
*Attorney, Agent, or Firm*—Hill, Van Santen, Steadman & Simpson

[57] ABSTRACT

A rod shaped or tubular housing for a sensor includes an interior space provided with upper and lower compensating openings and within which an ultrasound measured distance device. Below the ultrasound measured distance device, the interior is connected to the lower compensating opening through a narrow channel proceeding in an axial direction of the housing. The housing is formed of two half shells of plastic joined to one another whose wall parts engage into one another to form the narrow channel. The ultrasound transducers and the electrical leads are embedded into the half shells. A second ultrasound measured distance device which is in direct communication with the surrounding space may be provided above the interior space. The ultrasound transducer of the measured distance device is excited to transmit in a pulsed fashion.

10 Claims, 4 Drawing Sheets

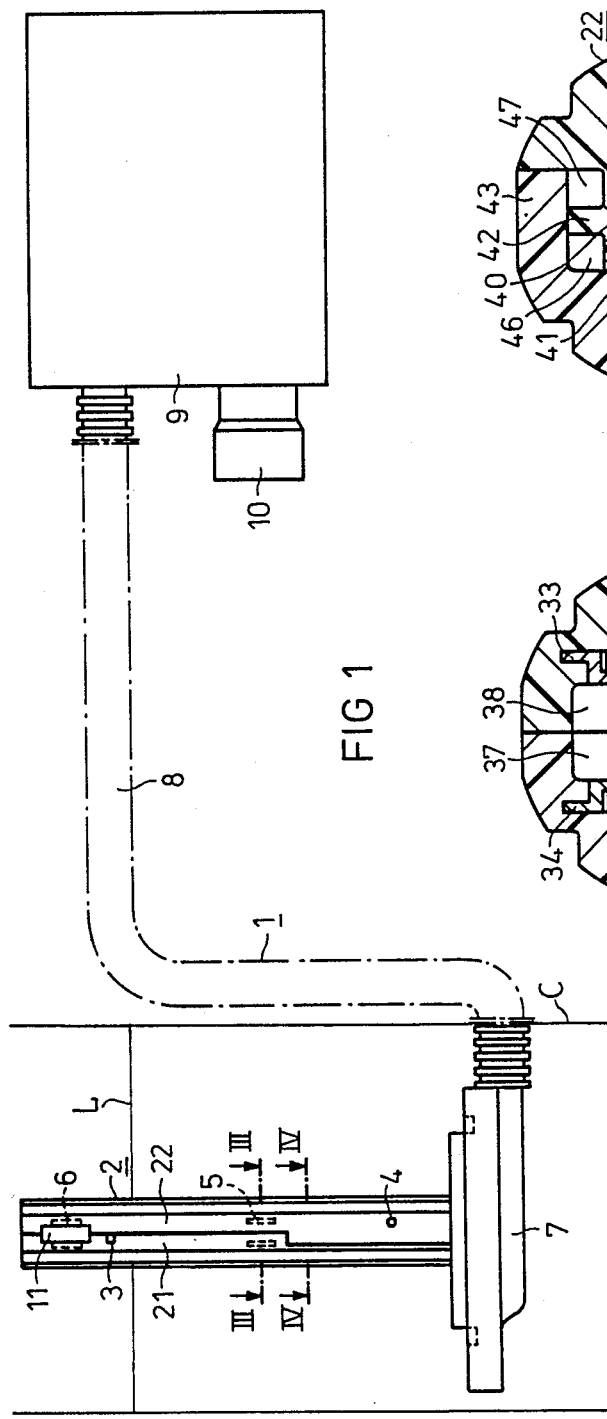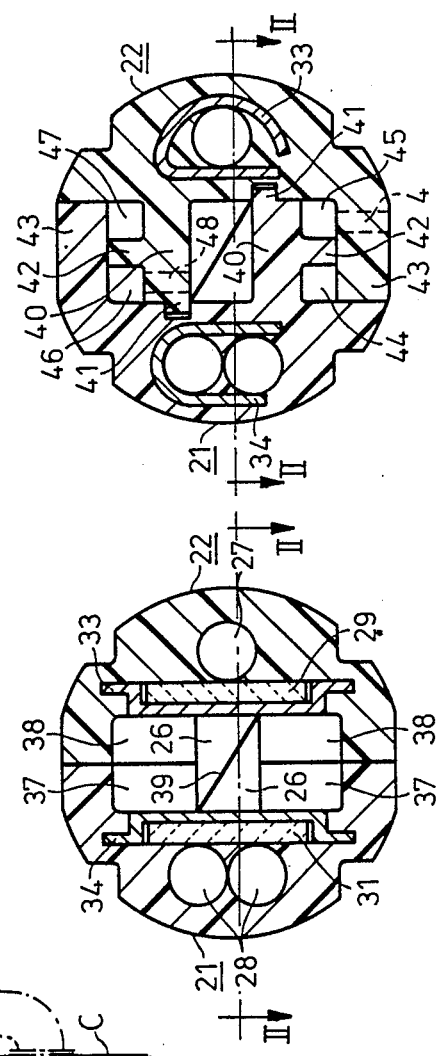

SENSOR FOR DETERMINING LIQUID LEVEL IN A CONTAINER

BACKGROUND OF THE INVENTION

1. Field of the Invention

The present invention is related generally to the field of level indicators and more particularly to a sensor arrangement with which the level of a liquid in a container is identified using an ultrasound measured length.

2. Description of the Related Art

A known sensor for determining a liquid level in a container is essentially composed of four elements, namely a tubular housing that is provided with a fastening flange and includes an interior which is in communication with a surrounding space through lower and upper compensating openings. Secondly, the sensor is composed of a plurality of ultrasound measured lengths radially penetrating an interior of the tubular housing and having ultrasound transducers arranged in pairs in the housing wall. Thirdly, the sensor is comprised of electrical leads leading to the electrodes from the housing control; and fourthly, control and evaluation electronic circuit is included connected to the ultrasound measured lengths through the electrical leads. See, for example, U.S. Pat. No. 4,063,457. The manufacture of the known sensor is rather involved, and when used in a container of greatly agitated liquid, inaccurate indications can occur.

A further device for measuring the liquid level in a motor vehicle tank is also known which is also an indicator including a float as the encoder that is arranged in a vertical immersion pipe. To dampen the motion of the float particularly in greatly agitated liquid levels, a channel is arranged in the floor of the immersion pipe which connects the interior of the immersion pipe to the tank. The channel is shaped with oppositely directed turns or may be in the shape of a spiral. See, for example, German Patent No. 12 08 089.

SUMMARY OF THE INVENTION

An object of the present invention is to provide improved indicating precision in a liquid level sensor. Over and above this, a second object of the invention is to reduce the structural outlay for the housing and the manufacturing cost of a sensor and to simplify the drive and evaluation electronics so that a high quality sensor is available overall at a favorable price.

To achieve these and other objects, a sensor is provided including a housing composed of two half shell of plastic joined to one another whereby each half shell surrounds an ultrasound transducer of an ultrasound measured length along with the appertaining electrical leads. The wall parts of the half shells engage into one another in a region below the ultrasound measured length to form a narrow channel which connects the interior of the housing to a lower compensating opening.

A sensor of the present design guarantees a constant level or a level which changes only slowly so that a stable liquid level is provided in the interior of the housing even for rapid or frequent movement or even turbulent movements in the liquid within the container, thus making erroneous indications impossible. The narrow channel which is provided effects a mechanically damped level compensation between the interior of the housing and the remaining space of a container.

The sensor arrangement enables the transducer elements of the ultrasound measured length or of several ultrasound measured lengths to be encapsulated into the half shells by casting or by injection during manufacture of the plastic half shells. Thus, further assembly steps of the housing assembly are unnecessary and superfluous. The two half shells of the housing are joined in a particularly simple way with either positive or non-positive locking means, for example by gluing, ultrasound welding, clamping, or a riveted connection. In particular, the two half shells can be pluggably joined to one another at one end and snappably joined to one another at their other end. To this end, the plug connection is composed of a male member and of an eyelet which engage with one another in an axial direction of the housing. The snap-in connection is expediently composed of a press button, or projection and recess, having parts which traversely engage into one another relative to the axial direction of the housing. Such a connection is especially simple to manipulate in terms of its assembly and is also accessible to an automatic fabricating process. The required sealing of the interior can be achieved by elastic stressing of the two half shells as a consequence of appropriate forming of the plug type connection and of the wall parts engaging into one another.

The inventive sensor is particularly useful in motor vehicles for indicating the level of the motor oil. To this end, moreover, it is recommended to arrange a second ultrasound measured distance above the interior cavity for direct communication with the surrounding space through a corresponding passage in the housing wall. This adds the possibility of also monitoring a further fluid level, which is usually present when the motor is at a standstill, for example. A damped level compensation is, therefore, not required for measuring this limit value since the liquid level is then generally not agitated. Further level readings may potentially be of interest within the limit range and are acquired in a known way by arranging further ultrasound measured distances inside or above the interior of the housing.

The narrow channel is formed by the engaging wall parts of the two plastic half shells which expediently are formed so that a channel is composed of at least one ascending or descending channel section that proceeds laterally from the interior. However, a labyrinth-like channel may also be provided which, in the simplest case, is formed by the two wall parts of the two half shells which engage into one another to form an ascending and a descending channel section. Such channel sections are connected to one another at, for example, their upper ends. However, a labyrinth-like channel may also be created or an existing labyrinth-like channel may be lengthened by providing a descending channel section at one side of the interior of the housing tube which is connected to an ascending channel section at the other side of the interior, the sections being connected at their lower ends by a tunnel arranged under the interior. In such embodiment, the narrow channel is composed of two or more sections joined to one another so that the effective length of the channel can be defined to any arbitrary length between 0 and a maximum length on the basis of two radial openings or bores which can entirely or partially penetrate the wall of the half shells.

The sensor is adapted to different demands with respect to damping of the level compensation. A first bore extends through the wall of the housing from the outside up to the ascending or the descending channel section at the one side and forms the lower compensating opening of the sensor. A second bore is required for connecting the interior to the narrow channel, the second bore extending from the inside to the descending or to the ascending channel section at one or the other side. The effective length of the narrow channel then is dependent on the height and position (ascending or descending channel section) of the two openings.

A further possibility for forming the narrow channel is when the narrow channel is composed of at least one channel section ascending from the lower compensating opening to the interior. In this embodiment, the narrow channel is essentially arranged under the interior of the housing tube which accepts the ultrasound measured distance; and consequently, the entire space available under the interior can be used for the development of the narrow channel. This especially establishes the possibility that the interengaging wall parts of the two half shells form two ascending channel sections in a descending channel section which joins the two ascending channel sections to one another. The descending channel section can than have a larger cross section then the two ascending channel sections.

To increase the flow resistance, the descending channel section is provided with at least two webs. In this case, the webs engage one another comb-like extending from two opposite channel sides. Moreover, the narrow channel can be further adapted to provide flow resistance by including an opening between the descending channel section and one or both ascending channel sections. As a result, the flow path is shortened in the respective ascending channel section as well as in the descending channel section. Further, it is expedient that the ascending channel section leading to the interior does not already discharge at the floor of the interior but does not discharge into the interior until directly below the response threshold of the ultrasound measured distance. A region of the interior that is always filled with a liquid is thus obtained under the ultrasound measured distance, so that a precise indication of the sensor is guaranteed even for an oblique position of the container.

With respect to embedding the ultrasound transducers or one of the appertaining electrical leads in the plastic half shells, an embodiment is recommended wherein the ultrasound transducer or transducers and the electrical leads are fixed to a carrier element in each of the plastic half shells. This facilitates positioning of the ultrasound transducers and of the electrical leads in the injection molding die for the manufacture plastic half shells. It is also possible that the electrical leads themselves form a carrying element for the ultrasound transducer or transducers in each of the plastic half shell. In this case, the leads, for example, are formed as wires, pins or punched sheet metal strips.

In a further development of the invention, the drive and evaluation electronic circuits are provided so that the drive electronics contains a clock generator which generates a voltage pulse having a pulse duration of approximately 0.5 through 10 μs at the transmission electrode of the respective measured distance. The pulse frequency thereby expediently lies at between 0.05 through 10 Hz. A frequency generator having a frequency modulation is not required with such a drive of the transmission transducer. A further advantage is that changes in the resonant frequency of the sensor that are caused by temperature and/or scattering are insignificant due to the individual pulse excitation of the transmission transducer.

BRIEF DESCRIPTION OF THE DRAWINGS

FIG. 1 is an overall elevational view of a first embodiment of a sensor according to the principles of the present invention;

FIG. 3 is a horizontal cross section along line III—III of FIG. 1 through the housing in the region of an ultrasound measured distance;

FIG. 4 is a cross section along line IV—IV of FIG. 1 through the housing in the region of a narrow channel;

DESCRIPTION OF THE PREFERRED EMBODIMENTS

Figure 2:
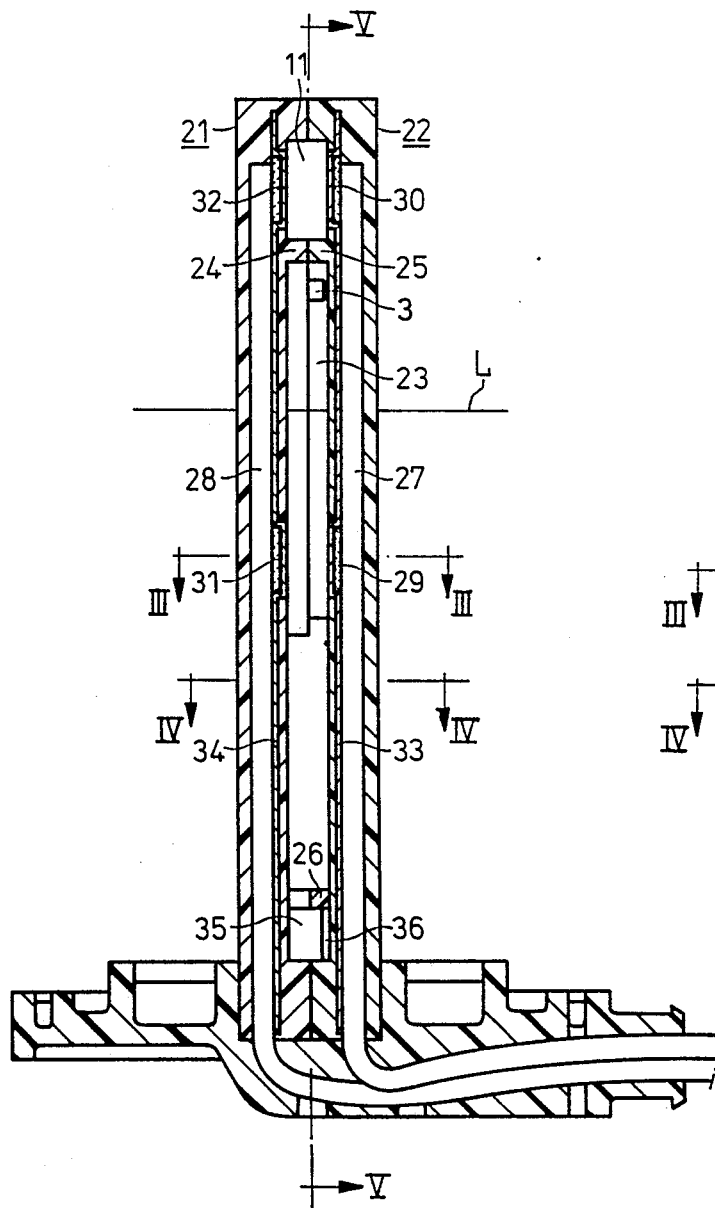
FIG. 2 is a longitudinal cross along line II—II of FIGS. 3 and 4 through a tubular housing and fastening flange of the first embodiment of the present sensor.

As shown in FIG. 1, a sensor 1 of the present invention is composed of a tubular housing 2 having a fastening flange 7 arranged at the bottom for mounting in a liquid container C, a connecting hose 8 for accepting electrical connecting lines, and a housing 9 within which is drive and evaluational electronic circuits, the housing 9 being provided with a plug connection 10. The tubular housing 2 is composed of two half shells 21 and 22 which form an interior space (not shown in detail in FIG. 1). The interior space is connected to a surrounding space, such as a liquid container or tank C in which is held a liquid L, by an upper compensating opening 3 and a lower compensating opening 4. An ultrasound measured distance means 5 is arranged at roughly half the length of the housing 2, whereas an identical measured distance means 6 is arranged at an upper end of the housing 2 in the region of a passage 11.

Referring to FIG. 2, the two half shells 21 and 22 of the tubular housing 2, which are preferably formed of identically fashioned injection molded plastic parts, together form an interior space 23 which is limited by the walls of the two half shells 21 and 22 as well as by upper cross webs, or cross bars, 24 and 25 and by a lower cross web or cross bar, 26 of the second half shell 22 and a corresponding cross web, or cross bar (not shown) of the first half shell 21. Electrical leads 27 and 28 which lead to ultrasound transmission transducers 29 and 30 and to ultrasound reception transducers 31 and 32 are embedded in the two half shells 21 and 22. The transducers 29, 30, 31 and 32 form the two ultrasound measured distance means and, along with the electrical leads 27 and 28, are situated on carrier members 33 and 34 which are preferably of sheet metal parts. The ultrasound transducer pairs detect the presence or absence of liquid by a transversely directed ultrasound energy field.

A tunnel 35 is provided under the interior space 23 to connect channel sections of a narrow channel to one another through a slot 36 in the second half shell 22 and through a corresponding slot in the first half shell 21. The interior space 23 communicates with the surrounding space via this channel through the lower compensating opening 4.

Figure 5:
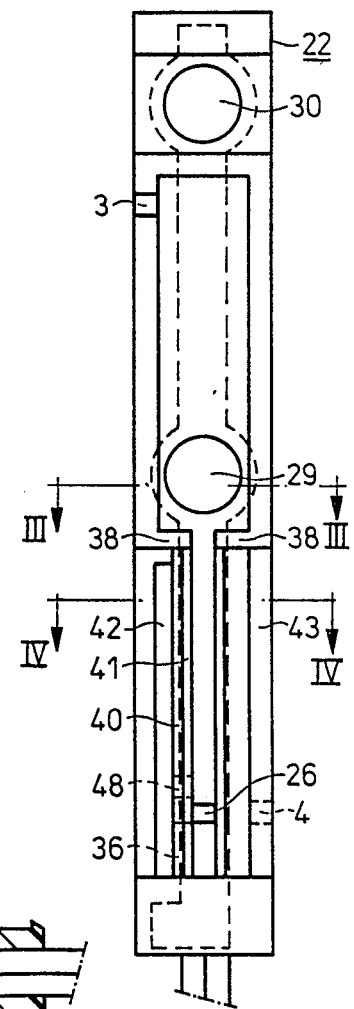
FIG. 5 is a front elevational view showing an inside of one half shell of the tubular housing of the first embodiment.

In FIG. 3 is shown a cross section in the region of the ultrasound measured distance means 5 in which the interior space of the housing 2 is subdivided into an upper space and a lower space by inwardly projecting cross webs 37 and 38, the cross webs 38 also being shown in FIG. 5. A seam 39 between the lower cross web 26 of the second half shell 22 and the corresponding cross web 26 of the first half shell 21 may be seen through the remaining opening between the cross webs. Further, the electrical leads 27 to the two transmission transducers 29 and 30 and the electrical leads 28 to the two reception transducers 31 and 32 are also shown.

Referring to FIGS. 4 and 5, wall parts of the two half shells 21 and 22 are formed in a specific fashion under the cross webs 37 and 38. Every half shell includes an inside wall 40 which has a projection 41 engaging into the other half shell and is provided with a lateral web 42. An outside wall 43 of the one half shell that is also provided forms channel sections 44 and 45 and 46 and 47, respectively with the inside wall 40 and the lateral web 42 of the other half shell. Since the lateral web 42, as shown in FIG. 5, ends below the cross web 37 or 38, the two channel sections 44 and 45 or 46 and 47, respectively, have their upper ends connected to one another. The slot 36, which is also seen in FIG. 2, is provided at a lower end of the channel section 44 and 46 below the lower cross webs so that the channel sections 45 and 47 are joined to one another through the tunnel 35 (see FIG. 2).

The bore 4 which forms the lower compensating opening of the interior space 23 is conducted through the outside wall 43 of the second half shell 22. An identical bore 48 penetrates the inside wall 40 of the second half shell 22. Consequently, the outside space is connected to the lower part of the inside space 23 through the bore, via the upwardly proceeding channel section 45, via the subsequent downwardly proceeding channel section 44, via the tunnel 35, via the ascending channel section 47, via the downwardly proceeding channel section 46 and via the bore 48. The four channel sections 44 through 47 thus form a narrow channel having a rectangular, preferably quadratic cross section. The cross-sectional area of the channel sections amounts to from about 0.5 through 4 mm$^2$, depending on the viscosity of the liquid in which the apparatus is used and also upon the desired damping of the liquid compensation.

In the exemplary embodiment of FIGS. 1 through 5, the fastening flange 7 is arranged at the lower end of the housing tube 2. It can also be arranged at the upper end of the housing in order to be able to fasten the housing 2 into a container from above. In any case, care must be exercised to achieve a tight connection between the housing 2 and the emerging electrical leads on the one hand and the fastening flange on the other hand during the manufacture of the fastening flange by injection molding or some other form of manufacture. The fastening flange 7, thus, enables the device to be mounted within a liquid container such as in a oil system of a motor vehicle.

Figure 6:
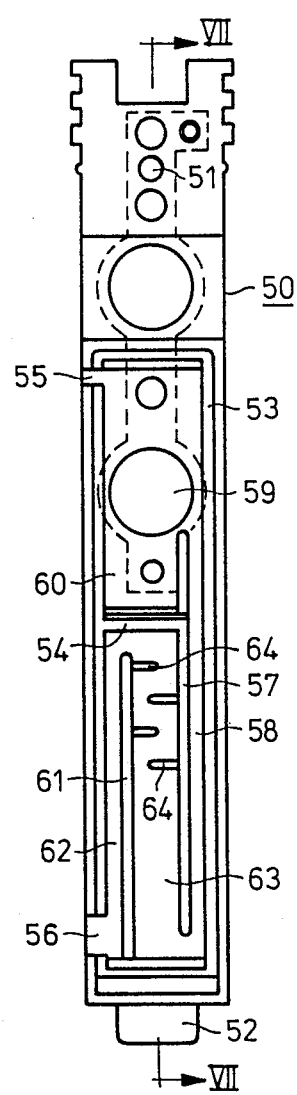
FIG. 6 is a front elevational view along line V—V of FIG. 2 of a first half shell of a tubular housing of a second exemplary embodiment of the sensor.
Figure 7:
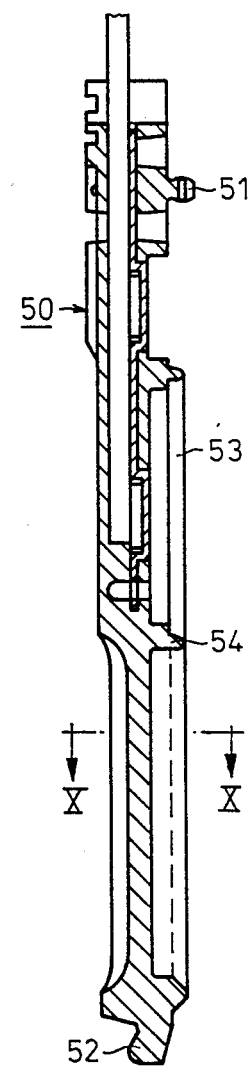
FIG. 7 is a longitudinal cross section, along the line VII—VII of FIG. 6 of the first half shell of the tubular housing of FIG. 6.
Figure 8:
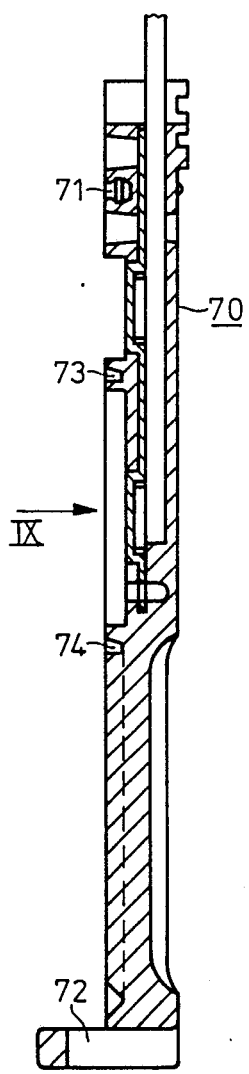
FIG. 8 is a longitudinal cross section along line VIII—VIII of FIG. 6 of a second half shell of the tubular housing of the second embodiment of the invention.
Figure 9:
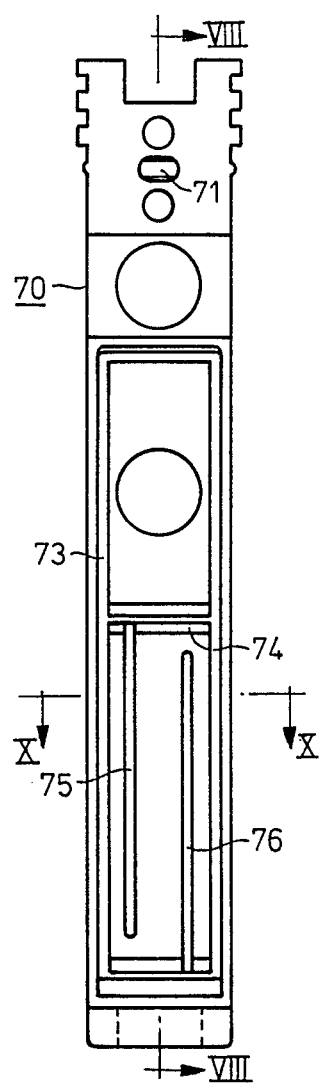
FIG. 9 is a front elevational view in the direction of arrow IX of FIG. 8 of the second half shell of FIG. 8.

A second embodiment includes a half shell as shown in FIGS. 6 and 7 having an upper end which is ready for the injection of a fastening flange and which is provided with a press button part, or projection, 51 directly therebelow and with a nose or tab 52 at the lower end. The first half shell 50 includes an all around web, or ridge, 53 with an upper compensating opening 55 and a lower compensating opening 56 provided in the region of the web 53. A longitudinal web 57 and a cross web 54 connecting the longitudinal web 57 to the all around web 53 are also provided within the all around web 53. The cross web 54 downwardly limits an interior space formed in collaboration with a second half shell as shown in FIGS. 8 and 9. The longitudinal web 57 and the all around web 53 form a channel section 58 therebetween, an upper end thereof terminating immediately under the operating threshold or detection region, of a transducer element 59. Since an upper end of the longitudinal web 57 projects beyond the cross web 54, a sack-like region 60 which is always filled with liquid during operation of the sensor is situated below the transducer element 59.

A further longitudinal web 61 is provided in the lower part of the half shell 50. First, an ascending channel section 62 is formed by the further longitudinal web 61 between the longitudinal web 61 and the all around web 53 and, second, the descending channel section below the cross web 54 is formed between the longitudinal web 61 and the longitudinal web 57. Both the longitudinal web 57 as well as the lateral webs 64 of the longitudinal webs 61 project into the channel section 63, these webs engaging into one another in a cogged manner.

A half shell 70 shown in front view and longitudinal section in FIGS. 8 and 9 serves as a counterpart to the half shell 50 of FIG. 6 and 7. The upper end of the second half shell 70 is provided with a snap-in opening 71 with a restricted opening for snappably receiving the projection 51 of the shell 50 and the lower end thereof is provided with an eyelet 72 into which the tab 52 is pluggably received. Moreover, an all around groove 73 is included with a transverse groove 74 and two longitudinal grooves 75 and 76. The nose or tab 52 of the first half shell 50 is inclined slightly in a backward direction and is simply introduced into the eyelet 72 of the second half shell. At this time, the two half shells are pressed securely together when the two press button, or snap-in, parts 51 and 71 are joined. The slight backward inclination of the tab 52 causes a pressing or elastic bracing of the two half shells together for improved sealing, particularly when the mutually adjacent surfaces of the two half shells are slightly arched in opposite directions.

Figure 10:
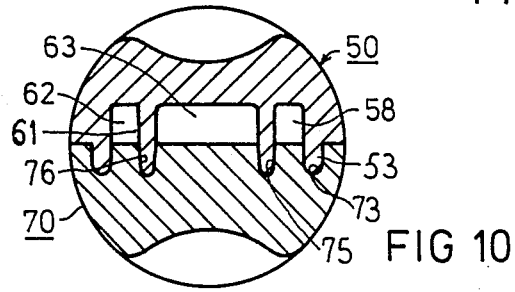
FIG. 10 is a horizontal cross section generally in the direction of line X—X in FIGS. 7 and 9 through both half shells of the second embodiment of the invention in the region of a narrow channel.

As shown in FIG. 10, a narrow channel which is composed of the channel sections 58, 62 and 63 is formed by the interengaging all around webs 53 and grooves 73, as well as by all of the longitudinal webs 61 and 57 and longitudinal grooves 75 and 76 in the assembled half shells 50 and 70. The longitudinal web 61 and the longitudinal groove 76 are formed so that they end below the cross web 54 and the cross groove 74, whereas the longitudinal web 57 and the longitudinal groove 75 end above the lower cross section of the all around web 53 and the all around groove 73.

Although other modifications and changes may be suggested by those skilled in the art, it is the intention of the inventors to embody within the patent warranted hereon all changes and modifications as reasonably and properly come within the scope of their contribution to the art.

We claim:

1. Sensor means for determining liquid level in a container, comprising:
    a tubular housing in said container and having a fastening flange, an interior of said tubular housing defining an interior space in communication with a surrounding space via upper and lower compensating openings;
    means defining a measured distance which transversely penetrates said interior space of said tubular housing, said means including a pair of ultrasound transducers arranged in an interior wall of said housing;
    drive and evaluation electronics connected to said means defining a measuring distance via electrical leads that extend in said housing wall to said ultrasound transducers; and
    said tubular housing being composed of two half shells of plastic joined to one another and defining said interior space, each of said half shells surrounds one of said ultrasound transducers of said measured distance means including said electrical leads, said half shells having wall parts engaging into one another in a region below said measured distance means to form a narrow channel proceeding in an axial direction of said tubular housing, said narrow channel connecting said interior space of said housing to said lower compensating opening.

2. A sensor means as claimed in claim 1, wherein said narrow channel includes at least one channel section proceeding laterally relative to an interior of said tubular housing.

3. A sensor means as claimed in claim 2, wherein said at least one channel section is ascending.

4. A sensor means as claimed in claim 2, wherein said at least one channel section is descending.

5. A sensor means as claimed in claim 2, wherein said narrow channel is connected to said interior and to a surrounding space by transverse openings.

6. A sensor means as claimed in claim 1, wherein said narrow channel includes at least one channel section ascending from said lower compensating opening to an interior of said tubular housing.

7. A sensor means as claimed in claim 6, wherein said wall parts of said two half shells form two ascending channel sections and a descending channel section that joins said two ascending channel sections to one another.

8. A sensor means as claimed in claim 7, wherein one of said two ascending channel sections discharges immediately under a operating threshold of said ultrasound measured distance.

9. A sensor means as claimed in claim 2, wherein said two half shells include means for pluggably joining to one another at a first end and means for snappably joining to one another at a second end.

10. A sensor means as claimed in claim 2, further comprising:
    means defining a second ultrasound measured distance arranged above said interior end being is direct communication with the surrounding space through a corresponding passage in said housing wall.

* * * * *